Dec. 4, 1945.   E. P. LAMB ET AL   2,390,218.
MOTOR VEHICLE
Filed Oct. 28, 1943
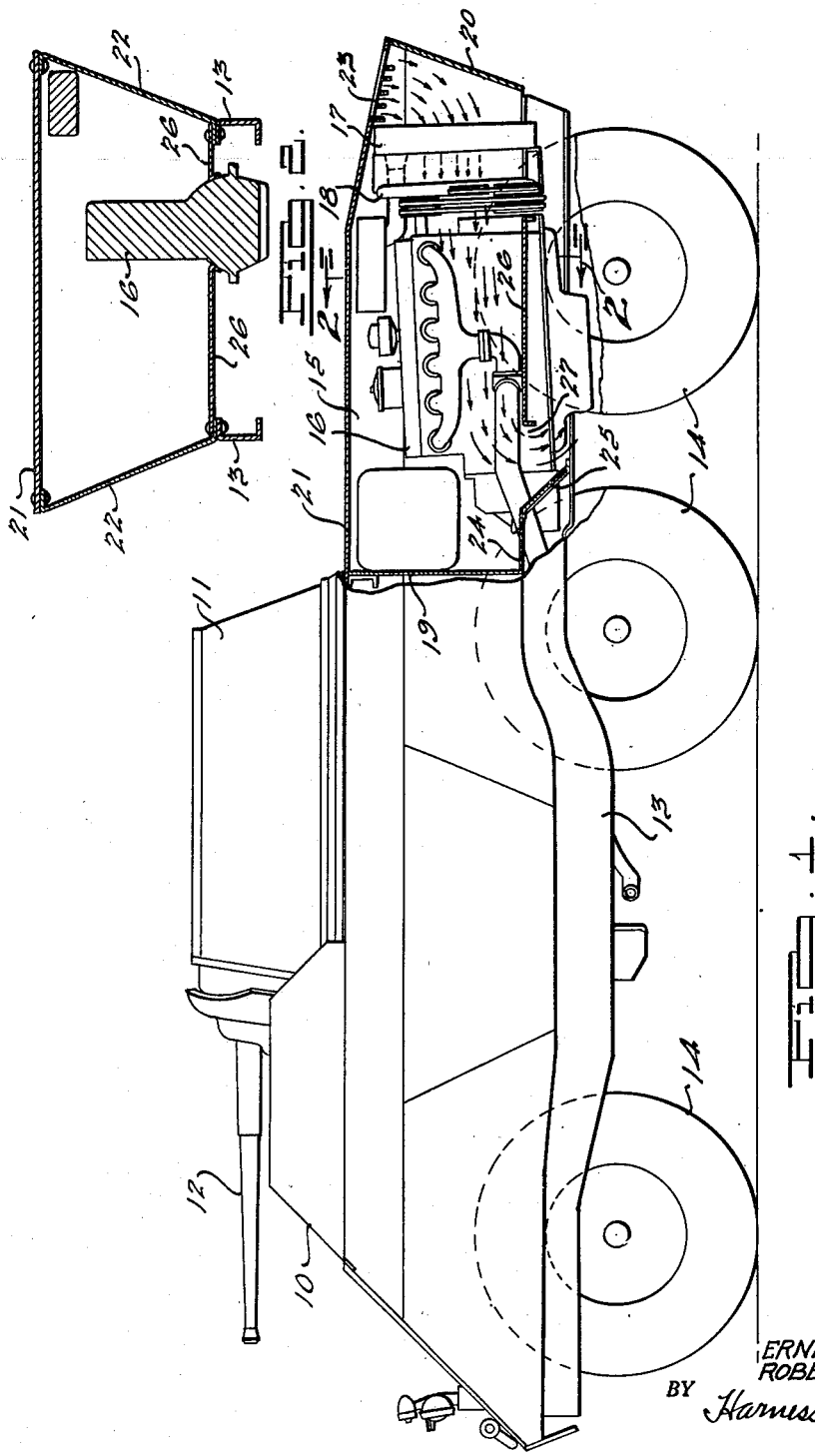
INVENTORS.
ERNEST P. LAMB
ROBERT H. DUFF
BY Harness & Harris
ATTORNEYS.

Patented Dec. 4, 1945

2,390,218

UNITED STATES PATENT OFFICE 2,390,218

MOTOR VEHICLE

Ernest P. Lamb, Grosse Pointe Park, and Robert H. Duff, Detroit, Mich., assignors to Chrysler Corporation, Highland Park, Mich., a corporation of Delaware Application October 28, 1943, Serial No. 507,972

2 Claims. (Cl. 180—54)

This invention relates to a motor vehicle and more particularly to improvements for controlling the temperature of the cooling medium for an internal combustion engine constituting the vehicle power unit.

An object of the invention is the provision of an improved arrangement for controlling the temperature of the cooling medium for an internal combustion engine positioned at the rear of the vehicle and particularly to provide for the admission of air to and discharge from the engine compartment; to provide housing having air inlet and outlet means so arranged as to effectively ventilate the compartment in conjunction with temperature control as aforesaid; and to so construct the housing that air admitted to the compartment is withdrawn therefrom as an incident to movement of the vehicle.

Other objects and advantages of the invention will be more apparent from the following description taken in connection with the accompanying drawing, in which:

Fig. 1 is a side elevational view of a vehicle embodying the invention, parts being broken away to more fully disclose the adjacent structure.

Fig. 2 is a transverse section taken as indicated by the line 2—2 of Fig. 1.

The invention is embodied in a military vehicle having a gun mounted thereon and equipped in part with armor plate. As illustrated the vehicle is armor equipped at the forward part 10, on which part is rotatably mounted a turret 11 carrying a gun illustrated at 12. The vehicle chassis includes a frame structure having spaced side rails 13, and suitably mounted on road wheels 14, a set of three of the latter being disposed at each side of the frame. At the rear of the armored part 10 is compartment 15 for an internal combustion engine 16 constituting the power unit for driving the vehicle through suitable driving and control mechanisms not shown herein as the latter are not a part of the invention.

The engine 16 is provided with the conventional system for circulation of a liquid cooling medium and associated with this system is a radiator 17 having the well known core (not shown) through which air is passed to control the temperature of the cooling medium as the latter is circulated through the radiator. Air for this control is adapted to be drawn through the radiator 17 by a suction type fan 18 driven from the engine 16.

The compartment 15 has a housing substantially closing the same, except as hereinafter set forth, and includes the transversely extending bulkhead 19 forming the front wall for the compartment and a rear wall 20. Extending between the walls 19 and 20 is a top-forming wall 21 projecting laterally outwardly over each of the rearmost wheels 14, and side-forming walls 22 extending inwardly toward the engine 16 and between the latter and the adjacent wheel 14, as more particularly shown in Fig. 2. The top wall 21 has a grill-like work at 23 between the radiator 17 and end wall 20 constituting an opening through which air is drawn by the fan 18 for passage through the radiator 17 and forwardly of the compartment 15 as indicated by the arrows in Fig. 1.

The compartment 15 is provided with a bottom wall including a member 24 extending rearwardly from the bulkhead or front wall 19 and having the mid-portion thereof recessed so that a part thereof extends rearwardly beyond the adjacent end of the motor 16 on either side of the latter. Each such part has secured thereto a downwardly and rearwardly inclined extension 25 although the latter may, if desired, be formed integral with the member 24. Each extension 25 as well as the member 24 is suitably supported from the frame. A dust pan 26 extends between the motor and each side wall part 22 and forwardly to a location adjacent the fan 18 and thus provides a portion of the bottom wall for the compartment 15. Each pan 26 is suitably supported from the adjacent side-forming wall 21 and the frame side rail and terminates short of the member 24 to provide an air outlet opening indicated at 27, the flow of air between the openings 23 and 27 being indicated by the arrows in Fig. 1. Each extension 25 terminates below the adjacent pan 26 and projects into the rearwardly moving air stream induced by forward movement of the vehicle, thus causing this stream of air to create a suction action adjacent the opening 27 for withdrawing air from the compartment 15.

Although but one specific embodiment of the invention has herein been shown and described, it will be understood that various changes in the size, shape and arrangement of parts may be made without departing from the spirit of the invention.

We claim:

1. A motor vehicle including an internal combustion engine at the rear thereof having a circulating system for a liquid cooling medium, a radiator core in said system, a fan driven by said engine disposed between the latter and said core for drawing air through said core, a housing for said engine, core and fan adapted to receive air from said fan for circulation about said engine, said housing including front and rear end walls and a top wall extending between the latter having a part thereof rearwardly of the fan, engine and core provided with an air inlet opening, side wall-forming parts cooperating with said end and top walls, and bottom-forming wall means including a part projecting rearwardly from said front wall having a downwardly extending terminal portion and a pair of dust pans extending between said engine and a respective side wall disposed above said downwardly extending part and terminating short thereof to provide an opening therebetween adjacent the end of said engine remote from said fan and communicating with atmosphere for discharge from said housing of air circulated about said engine.

2. A motor vehicle including an internal combustion engine at the rear thereof having a circulating system for a liquid cooling medium, a radiator in said system, a housing forming a compartment for the engine having an air inlet opening rearwardly of the engine and radiator and into said compartment for circulation about said engine, a fan driven by the engine for drawing air through the inlet opening and radiator, said housing having an air outlet opening adjacent the front of said compartment communicating with atmosphere, a portion of the housing immediately forward of the outlet opening extending below that portion of the housing immediately rearward of the outlet opening whereby a suction effect is created at the outlet opening incident to forward movement of the vehicle.

ERNEST P. LAMB.
ROBERT H. DUFF.